United States Patent
Summerfield et al.

(10) Patent No.: US 8,062,104 B2
(45) Date of Patent: Nov. 22, 2011

(54) USE OF HIGH PRESSURE PROCESSING TO AID IN THE HAIR OR FEATHER REMOVAL FROM ANIMAL CARCASSES/HIDES

(75) Inventors: John William Summerfield, Austin, MN (US); Nathan Ryan Smit, Brownsdale, MN (US); Jerry Earl Cannon, Austin, MN (US)

(73) Assignee: Hormel Foods Corporation, Austin, MN (US)

( * ) Notice: Subject to any disclaimer, the term of this patent is extended or adjusted under 35 U.S.C. 154(b) by 312 days.

(21) Appl. No.: 12/568,806

(22) Filed: Sep. 29, 2009

(65) Prior Publication Data

US 2011/0076929 A1    Mar. 31, 2011

(51) Int. Cl.
  *A22C 21/02* (2006.01)
(52) U.S. Cl. .......................................................... 452/71
(58) Field of Classification Search ................. 452/71, 452/125, 128–130
  See application file for complete search history.

(56) References Cited

U.S. PATENT DOCUMENTS

| | | | |
|---|---|---|---|
| 1,474,702 A | 11/1923 | Atkinson | |
| 1,764,425 A | 6/1930 | Thomas | |
| 2,783,496 A | 3/1957 | Thomas | |
| 2,820,246 A | 1/1958 | Thomas | |
| 3,094,740 A | 6/1963 | Reeves | |
| 3,744,088 A | 7/1973 | Snowden | |
| 3,748,691 A | 7/1973 | Snowden | |
| 4,035,868 A * | 7/1977 | Gardner et al. | 452/128 |
| 4,118,830 A | 10/1978 | Weiland | |
| 4,762,522 A * | 8/1988 | Maue | 8/94.19 R |
| 5,405,289 A | 4/1995 | Schumann et al. | |
| 5,569,071 A | 10/1996 | Metier et al. | |
| 5,607,349 A * | 3/1997 | Karubian et al. | 452/173 |
| 5,632,671 A * | 5/1997 | Ochylski | 452/128 |
| 2004/0115322 A1 | 6/2004 | Osborn | |

FOREIGN PATENT DOCUMENTS

| WO | WO 2004 093552 | 11/2004 |
|---|---|---|
| WO | WO/2006/137656 A1 | 12/2006 |

OTHER PUBLICATIONS

"High Pressure Processing of Seafood", http://www.avure.com/food/applications/seafood.1asp, 2 pages, ©2008 Avure Technologies Inc.

* cited by examiner

*Primary Examiner* — Richard Price, Jr.
(74) *Attorney, Agent, or Firm* — IPLM Group, P.A.

(57) ABSTRACT

High pressure processing is utilized to remove the external carcass portions from an animal carcass. The animal carcass is subjected to pressures of 50 MPa or greater to loosen the external carcass portions. In addition, high pressure processing is utilized to strengthen the hides of animal carcasses by subjecting them to pressures of from 10 to 50 MPa.

30 Claims, 12 Drawing Sheets

Pig's Ear Hair Removal (Force/hair (lb))

Beef Hair Removal - All at 95°F for 15 seconds
Force Determination ran 3 hrs after HPP Beef Hair Removal - All at 120 MPa for 15 sec.

Beef Hide Hair Removal - All at 95°F & 15 sec. Hold

Beef Hides Hiar Removal - All at 120 MPa @ ~70°F

Average Force to Remove Toenail

USE OF HIGH PRESSURE PROCESSING TO AID IN THE HAIR OR FEATHER REMOVAL FROM ANIMAL CARCASSES/HIDES

BACKGROUND OF THE INVENTION

1. Field of the Invention

This invention relates to the removal of hair, feathers, dewclaws and toenails from pigs, turkeys, beef and other animal carcasses/hides using high pressure processing. The use of high pressure processing loosens the hair follicles, feathers, toenails and dewclaws to the point were less mechanical action is required to remove the hair, feathers, toenails and dewclaws from the animal carcass.

2. Description of the Prior Art

Hair, feather and toenail removal is necessary in the modern day meat packing facility for numerous reasons:

1. Reduction of fecal and dirt contamination.
2. Reduction of food borne pathogens such as salmonella and e-coli.
3. Required by the USDA-FSIS.
4. Required for further hide processing.

Currently most pork and turkey packing facilities use some form of "scald" tank to aid in the removal of hair, feathers and nails. The typical processes are to first stun and bleed the animal. The animal is then placed in a scald tank of 135-145° F. water for 5-7 minutes, this helps loosen the hair or feathers. The temperature of the scald water may vary, depending on the animal. The animal then goes through a dehairing machine that "beats" the hair, nails and dewclaws off of the animal. The animal is then washed and sent through a "singeing" apparatus and "polishers" to remove any remaining hair. The singeing apparatus has flames that burn the hair off and the polishers are plastic whips that mechanically remove the hair. Even with all of these processes in place, the hair removal is often incomplete. The hide then needs to be removed from the carcass in the places where the hair remains.

With beef, there is a skinning operation and hair removal can be done either before or after skinning, in both the prior art and with the present invention.

The hair removal can be different on the same type of animal. For example, it is typically harder to remove the hair from dark haired pigs than it is from white haired pigs. The time of year also affects the hair removal; fall and spring are the times where it becomes harder to remove the hair from the pig carcasses.

Most meat processors struggle with the removal of hair and feathers from carcasses. The higher temperatures that are used in the scald tanks can be detrimental to the quality of the hide and the meat. If the temperature of the scald tank is too high or the animal is kept in the scald tank too long, the hide can be burned to the point were it can not be used for leather. The higher temperatures or longer times in the scald tank can also cook the meat on the carcass and/or accelerate the post mortem glycolitic reactions which negatively impact the muscle quality.

SUMMARY OF THE INVENTION

In one embodiment, the invention is a method of removing external carcass portions from an animal carcass. The method includes placing an animal carcass in a high pressure processing vessel. The animal carcass is subjected to a pressure greater than 50 MPa, wherein the external carcass portions are loosened from the carcass. The animal carcass is removed from the high pressure processing vessel and a force is applied to the external carcass portions to remove the external carcass portions from the animal carcass.

In another embodiment, the invention is a method of removing feathers from a poultry carcass. The method includes placing the poultry carcass in a high pressure processing vessel. The poultry carcass is subjected to a pressure of greater than 50 MPa, wherein feathers are loosened from the carcass. The poultry carcass is removed from the high pressure processing vessel and a force is applied to the feathers to remove the feathers from the carcass.

In another embodiment, the invention is a method of removing hair from a beef carcass. The method includes placing the beef carcass in a high pressure processing vessel. The beef carcass is subjected to a pressure of greater than 50 MPa, wherein hair is loosened from the carcass. The beef carcass is removed from the high pressure processing vessel and a force is applied to the hair to remove the hair from the carcass.

In another embodiment, the invention is a method of removing hair from a pig carcass. The method includes placing the pig carcass in a high pressure processing vessel. The pig carcass is subjected to a pressure of greater than 50 MPa, wherein hair is loosened from the carcass. The pig carcass is removed from the high pressure processing vessel and a force is applied to the hair to remove the hair from the carcass.

In another embodiment, the invention is a method of removing toenails from a pig carcass. The method includes placing the pig carcass in a high pressure processing vessel. The pig carcass is subjected to a pressure of greater than 50 MPa, wherein toenails are loosened from the carcass. The pig carcass is removed from the high pressure processing vessel and a force is applied to the toenails to remove the toenails from the carcass.

Finally, in another embodiment, the invention is a method of strengthening the hide of an animal carcass. The method includes placing an animal carcass in a high pressure processing vessel. The animal carcass is subjected to a pressure of from 10 MPa to 50 MPa. The animal carcass is removed from the high pressure processing vessel, wherein the animal carcasses hide is strengthened.

DETAILED DESCRIPTION OF A PREFERRED EMBODIMENT

The present invention utilizes high pressure processing to loosen the hair, feathers, toenails or dewclaws (collectively referred to as external carcass portions) from a carcass or hide wherein the external carcass portions can more easily be completely removed from the root. The carcass may be a pig, beef, turkey, chicken or other animal that is utilized for either meat or for its hide. It is important to remove the external carcass portions from an animal prior to further processing in a meat processing facility. The hair removal aids in the cleaning of the animals and helps minimize the potential for microbial growth during the further processing of the animal.

It has been known that warm water permanently loosens the hair, toenails, dewclaws and feathers from carcasses. It has also been discovered that high pressure processing also results in the loosening of the hair, toenails, dewclaws and feathers from carcasses. The present invention may utilize any suitable apparatus that may be utilized to provide high pressure processing (HPP). One example of such an apparatus is an NC Hyperbaric Wave 300.

The present invention provides for removing external carcass portions from an animal carcass by placing the animal carcass in a high pressure processing vessel. During the process, it is standard to insert water into the vessel to fill up the vessel prior to applying the high pressure. The animal carcass is then subjected to a high pressure for a period of time. The high pressure and the length of time will be discussed in more detail hereafter. Subjecting the animal carcass to the high pressure in the high pressure processing vessel loosens the external carcass portions. The animal carcass is then removed from the high pressure processing vessel and the carcass is then further processed to remove the external carcass portions. This may be accomplished by any means well known in the art, such as using a dehairing machine or polisher. Further, it should be noted that in all the examples noted below, the external carcass portions were removed manually in order to obtain a measurement of the force required to remove the external carcass portions. It would be understood that a mechanized version would typically be used during production. Further, it is appreciated that when the specification describes that an animal carcass is subjected to HPP, it is understood that this also includes if an animal is skinned and then subjected to HPP. Hence, "animal carcass", when used in the claims, also refers to skin from animal carcasses.

EXAMPLE 1

Figure 1:
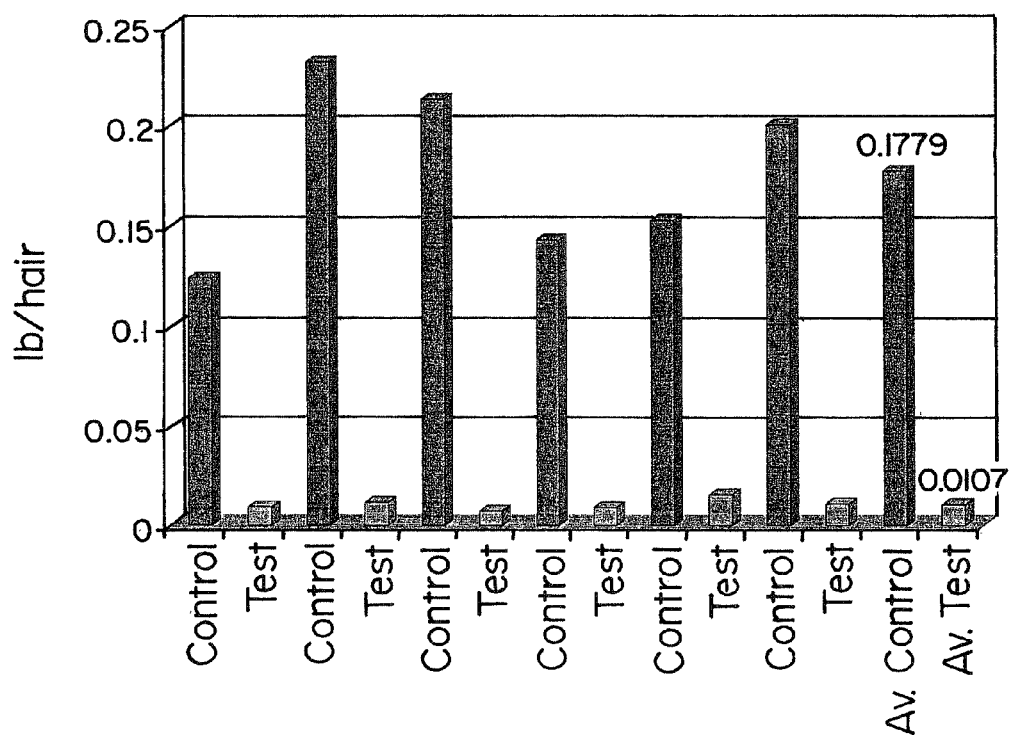
FIG. 1 is a graphical representation of the results of Example 1.
Figure 2:
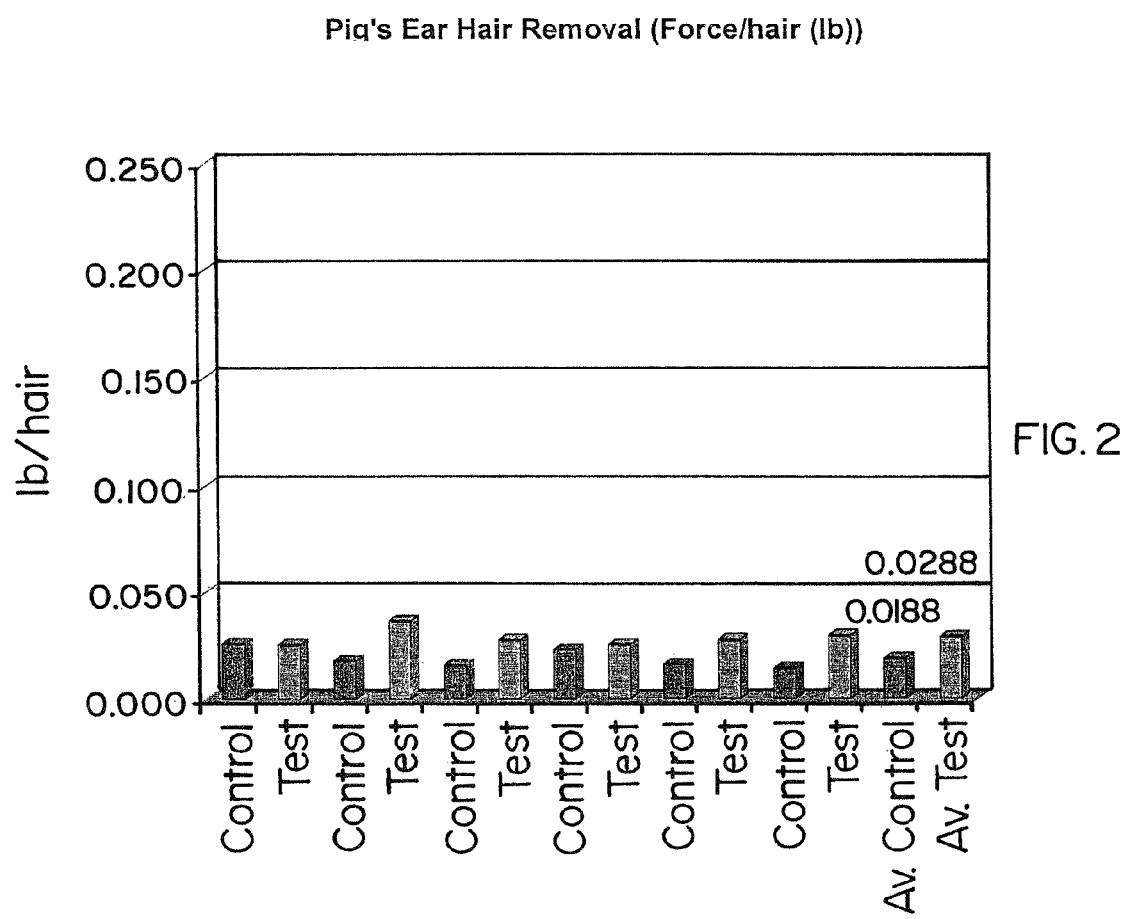
FIG. 2 is a graphical representation of the results of Example 2.

In the first example, two sets of paired ears were processed. Three measurements of the force required to remove hair from the skin were taken per ear. For the control ears, the test was conducted at room temperature and there was no scalding or further processing. For the test ears, the ears were subjected to a pressure of 225 MPa (megapascals) for 60 seconds. The water that was utilized in the vessel of the high pressure processing equipment was at 40° F. As can be seen in FIG. 1, the amount of force required to remove the hair from the pig's ear is significantly less when it has been processed with high pressure processing. There was a significant difference in the six tests that were run. Compared to the control ears, the test ears required a ten fold reduction of force to remove hair, 0.0107 pounds versus 0.1779 pounds. For this example, and the other examples, a WBS program, attached on a T.A.T.O. Plus Texture Analyzer from Texture Technology Corp., Scarsdale, N.Y. 10583, was used to evaluate force required to remove hair. Also, for this and the other examples, the product may be placed either in a bag and then placed in the high pressure processor, or water may be added to the bag, prior to placing in the high pressure processor.

It is understood that with respect to the high pressure processing there is a period of time that it takes to pressurize the vessel. For instance, in the tests that are to be discussed more fully hereafter, it takes approximately 1½ minutes (ramp up time) to increase the pressure to the desired pressure. The release (decompression) time is less, and is typically approximately 5 seconds. Therefore, when a hold time is discussed as 1 minute or less, the time refers to the time where the desired pressure was maintained. For processing in a manufacturing setting, it would be desired to have the ramp up time to be minimal so as to increase production rates.

EXAMPLE 2

In example 2, two sets of paired ears were utilized for each test. Three measurements of the force required to remove hair from the skin were taken per ear. Control ears were scalded in 138° F. water for 5 to 6 minutes. The purpose of the hot water was to simulate the current commercial scald tank conditions. The measurements were made immediately after scalding. Test ears were subjected to high pressure processing at 225 MPa for 60 seconds. The water utilized in the vessel was approximately 40° F. and the measurements were taken shortly after being high pressure processed. As can be seen, the high pressure processing results in similar hair removal capabilities, but at lower water temperature than scalding. However, the water temperature for scalding is almost 100° F. higher than it is for the high pressure processing in this example. This higher temperature, for longer periods of time, detrimentally affects the quality of the hide and meat if the meat was also subjected to this higher temperature.

EXAMPLE 3

Figure 3:
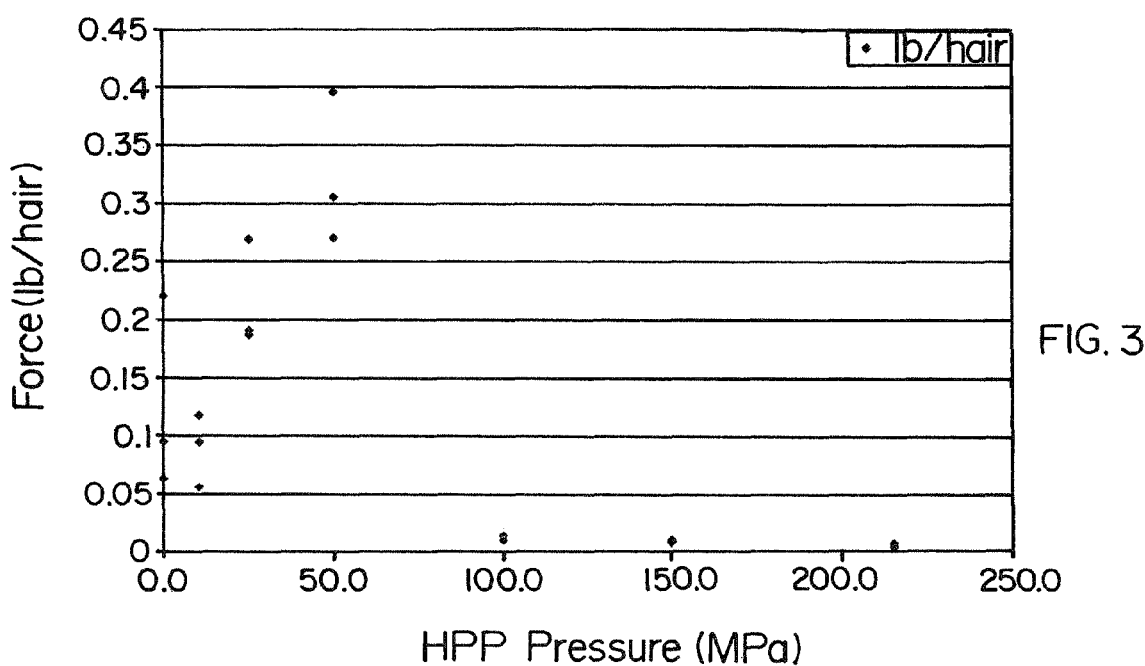
FIG. 3 is a graphical representation of the results of Example 3.

The chart shown in FIG. 3 shows the results of pig ears being treated with high pressure processing and water temperature of approximately 95° F. The ears were treated for 15 seconds at various pressures, from 0 to 220 MPa. Example 3 demonstrates that the pressure should be above 50 MPa to have a positive effect on the loosening of the hair from pig ears. At 100 MPa and above, the hair removal is dramatically improved.

EXAMPLE 4

In this example, two pig ears were tested at 100 MPa and 54° F. water at different hold times. The hold times varied from 0 seconds (the control) to 60 seconds. Force to remove hair was tested at two points on each ear. Below is a table showing the results of the tests at various pressures and for various durations.

A summary of the results are as follows:

| Seconds | Force - lb/hair |
|---|---|
| 0 | 0.623 |
| 15 | 0.350 |
| 30 | 0.299 |
| 60 | 0.157 |

Figure 4:
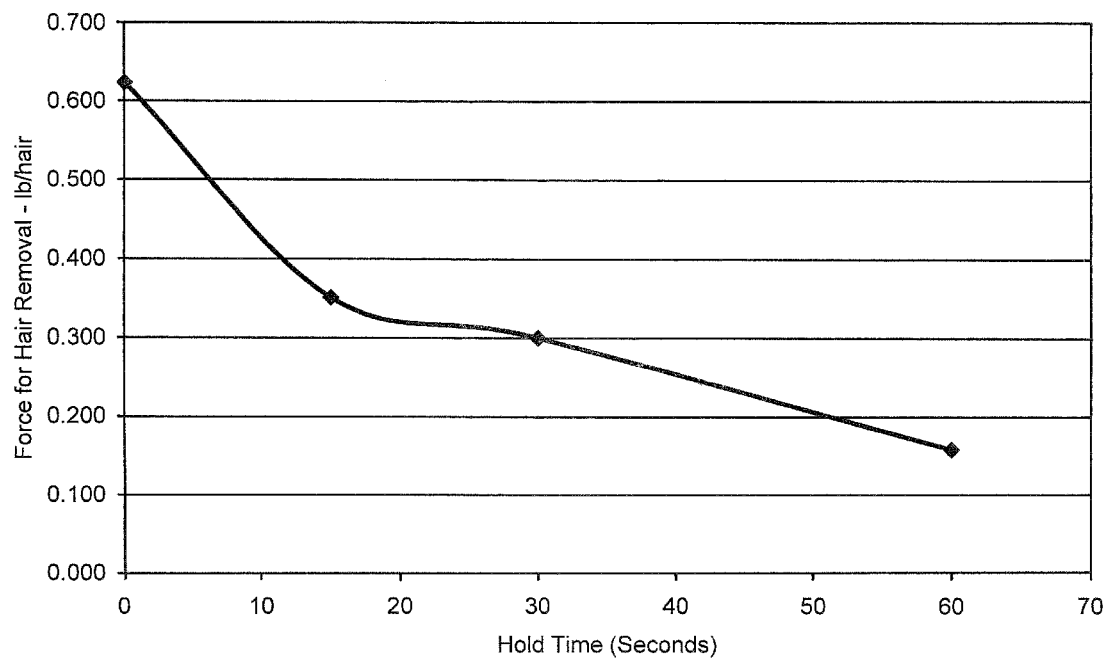
FIG. 4 is a graphical representation of the results of Example 4.

Further, the results of this example are shown graphically in FIG. 4. It can be seen that the force to remove the hair was less with increased hold time.

EXAMPLE 5

In Example 5, various combination of pressures (100, 150, and 200 MPa) and water temperatures (54°, 70°, and 100° F.) were evaluated and compared to a control. Ears were once again used, two ears per pressure by treatment combinations and two force measurements per ear. The results of this example show the reduction of force as pressure increased and also the reduction of force as water temperature increased.

A summary of the results is as follows:

|         | 54° F | 70° F | 100° F. |
|---------|-------|-------|---------|
| 0 MPa   | 0.623 | 0.623 | 0.623   |
| 100 MPa | 0.403 | 0.251 | 0.028   |
| 150 MPa | 0.074 | 0.057 | 0.014   |
| 200 MPa | 0.023 | 0.016 | 0.016   |

Figure 5:
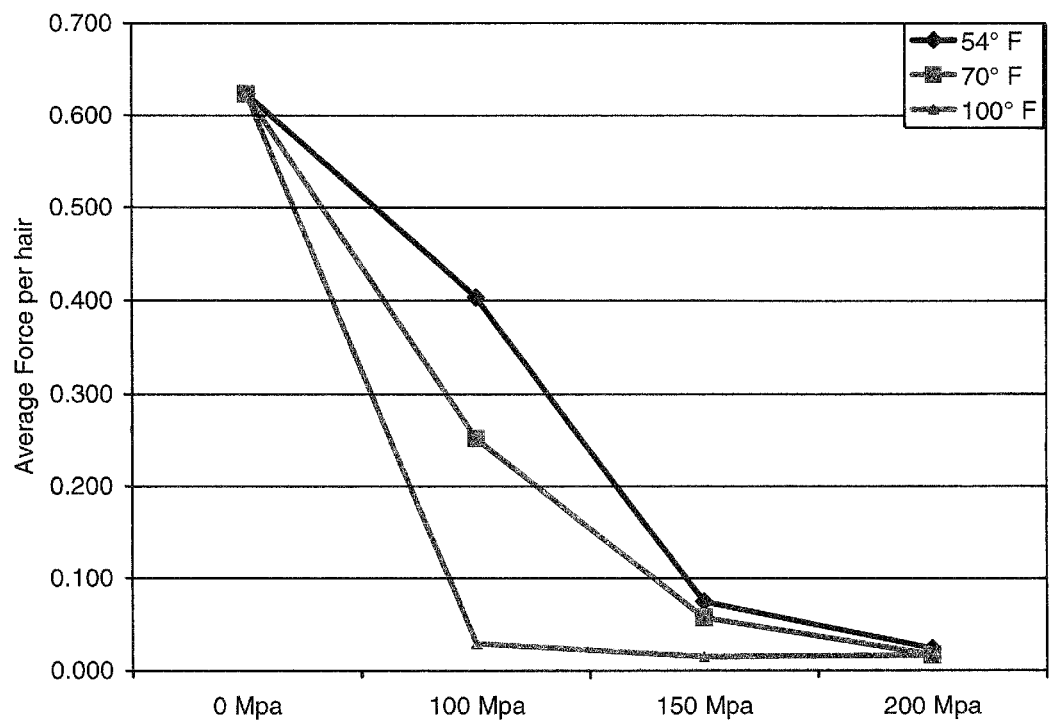
FIG. 5 is a graphical representation of the results of Example 5.

A graphical representation of this is shown in FIG. 5.

Pig ears were utilized in Examples 1-5, although it is understood that the same would apply to the removal of hair on the overall hides of the pigs.

The present invention is also applicable to beef hides. Various tests of the present invention, applied to beef hides, were conducted. It should be noted that the hair on the beef hides varied considerably in length and diameter. It was observed that the smaller hairs are easier to remove than the larger hairs. Because of this, there may be some additional variability in the testing of the hair due to this factor alone. The tests show the advantages of the present invention applied to beef hides. It will be shown below that it is desired water temperature used in the HPP vessel is to be 60° F. or above, and preferably 80° F. and above. Further, the hold pressure should be at least 50 MPa or more and preferably at least 100 MPa or more. The hold time does affect the hair removal, but not as significantly as water temperature and hold pressures. The effects of the high pressure processing of the beef hides and pig skins continues hours after they have been subjected to the high pressure processing as the testing for all these examples were run three hours after the high pressure processing was completed. Also, the beef or pig skins can still be high pressure processed if the skin has been removed from the carcass and held for an extended period prior to hair removal.

EXAMPLE 6

In Example 6, two beef hides were tested as controls and two beef hides were tested at each of four pressures. All of the water temperatures of the water in the vessel were 95° F. The hold time for all HPP was 15 seconds. The results of the tests are as follows:

A summary of the results is as follows:

| Pressure | Force lb/hair |
|----------|---------------|
| 0        | 0.046         |
| 100      | 0.016         |
| 150      | 0.009         |
| 200      | 0.004         |
| 250      | 0.008         |

Figure 6:
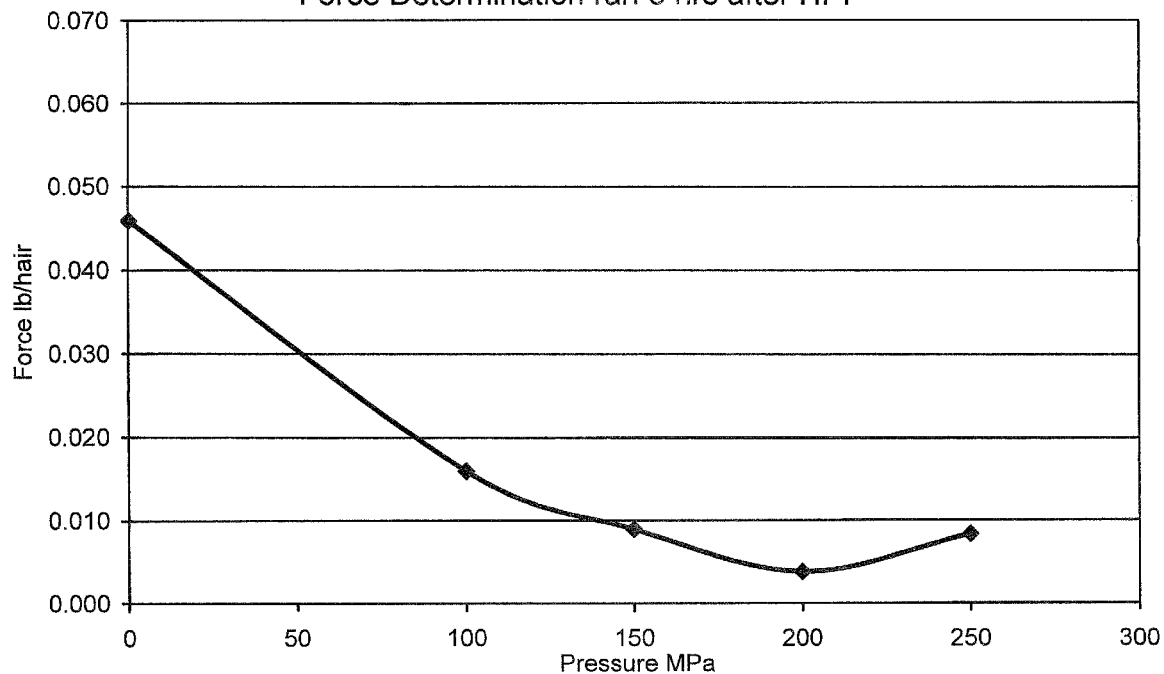
FIG. 6 is a graphical representation of the results of Example 6.

A graphic representation of these results is shown in FIG. 6. As can be seen, after 50 MPa, there was an improvement, but a more desirable improvement was found at 100 MPa and above, up to 250 MPa.

EXAMPLE 7

In example 7, for beef hides, the effect of varying water temperatures in the high pressure processing vessel was investigated. All tests were conducted at 120 MPa and water temperatures were at 54°, 84° or 100° F. The results of the test runs are shown as follows:

A summary of results is shown below:

| Temp ° F. | Force lb/hair |
|-----------|---------------|
| 0         | 0.046         |
| 54        | 0.045         |
| 84        | 0.016         |
| 100       | 0.012         |

Figure 7:
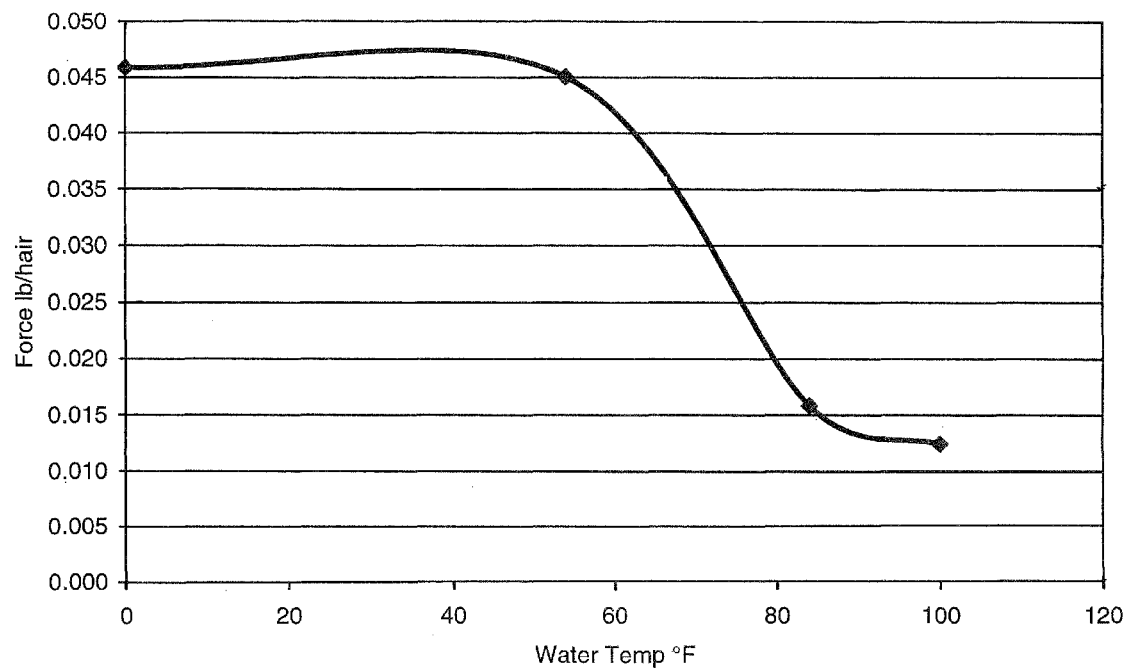
FIG. 7 is a graphical representation of the results of Example 7.
Figure 8:
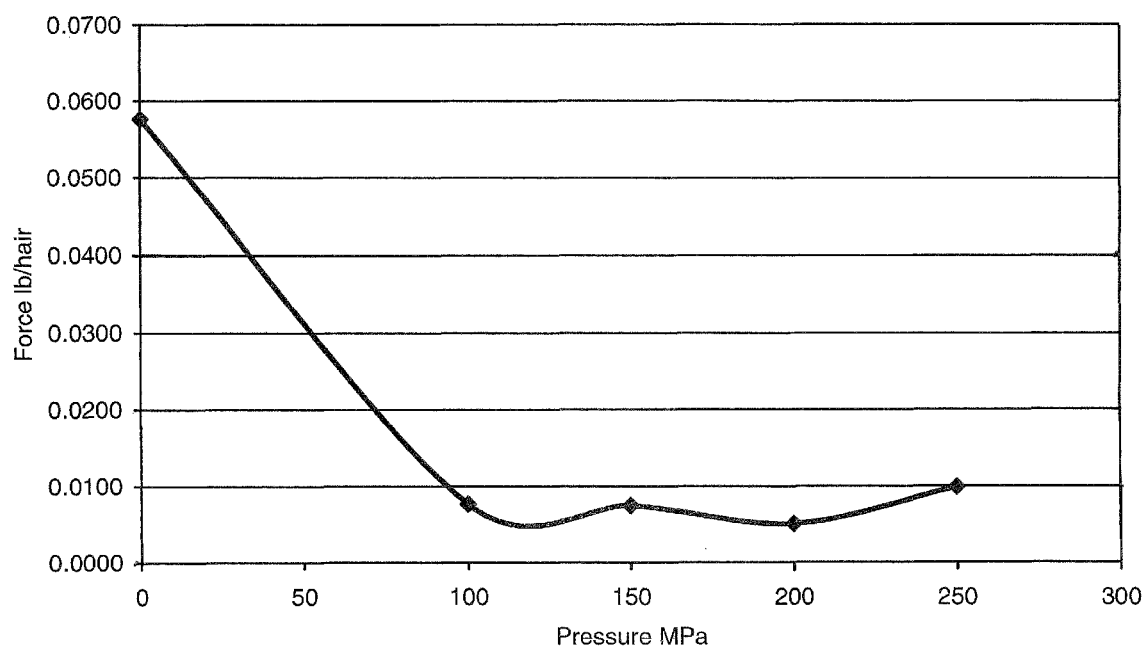
FIG. 8 is a graphical representation of the results of Example 8.

Finally, a graphical representation of this is shown in FIG. 7. Here, the results indicate that for best results, the water temperature should be above 54° F. and preferably above 60° F., and more preferably above 80° F.

EXAMPLE 8

In Example 8, the effect of varying hold pressure of high pressure processing of beef hides was investigated. Treatments include a control (no HPP) and four pressures (100, 150, 200 and 250 MPa). The hold time was 15 seconds and vessel water temperature was 95° F.

The following is a summary of the results:

| Pressure (MPa) | Force (lb/hair) |
|----------------|-----------------|
| 0              | 0.0576          |
| 100            | 0.0076          |
| 150            | 0.0074          |
| 200            | 0.0050          |
| 250            | 0.0098          |

As can be seen, the results indicated that a pressure of at least 50 MPa was preferred and preferably 100 MPa or greater. The results are consistent with that shown in Example 6. While the results are not identical, they are substantially similar and show the effectiveness of the present invention.

EXAMPLE 9

Example 9 for beef hides, similar to Example 4, shows the results of various hold times when the water temperature and pressure are constant. Again, two beef hides were the control and two beef hides were each tested at 15-, 30- and 60-second hold times. While the temperatures are not exactly the same, they are relatively close, varying from 66 to 79° F. The results of the test are shown in the table below.

The following is a summary of the results:

| Hold Time | Force lb/hair |
|---|---|
| 0 | 0.046 |
| 15 | 0.030 |
| 30 | 0.040 |
| 60 | 0.028 |

Figure 9:
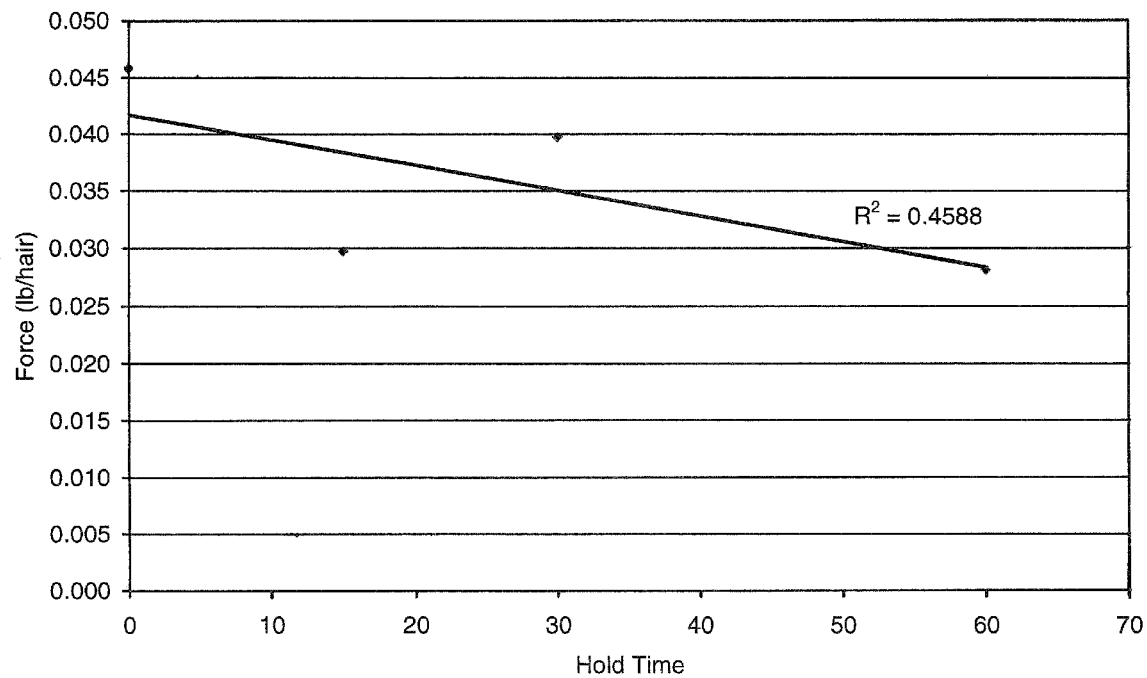
FIG. 9 is a graphical representation of the results of Example 9.

Finally, this is graphically represented in FIG. 9. Although not as significant as seen in Example 4, as hold time increased, hair removal improved.

EXAMPLE 10

Figure 10:
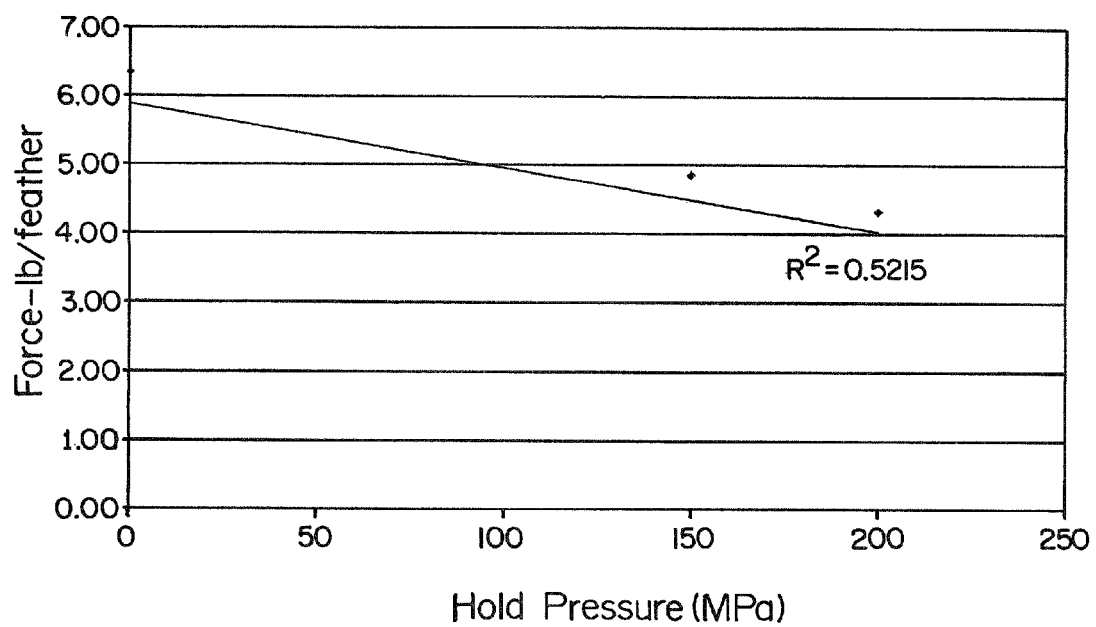
FIG. 10 is a graphical representation of the results of Example 10.

FIG. 10 represents the results of tests that were conducted when a turkey carcass, with feathers, was placed in a high pressure processing vessel to show the effects of the present invention on feather removal from turkeys. The turkey was processed at a water temperature of 100° F. for a 15-second hold time at various pressures. As can be seen in FIG. 10, the control (no high pressure processing) required a force of 6.3 lbs. per feather for removal. At 100 MPa the force was 3.84 lbs per feather. At 150 MPa the pressure required was 4.86 lbs per feather and finally at 200 MPa, the force was 4.33 lbs per feather. It is therefore preferable that a pressure of at least 50 MPa or higher is utilized and more preferred that the pressure is 100 MPa or above.

EXAMPLE 11

Figure 11:
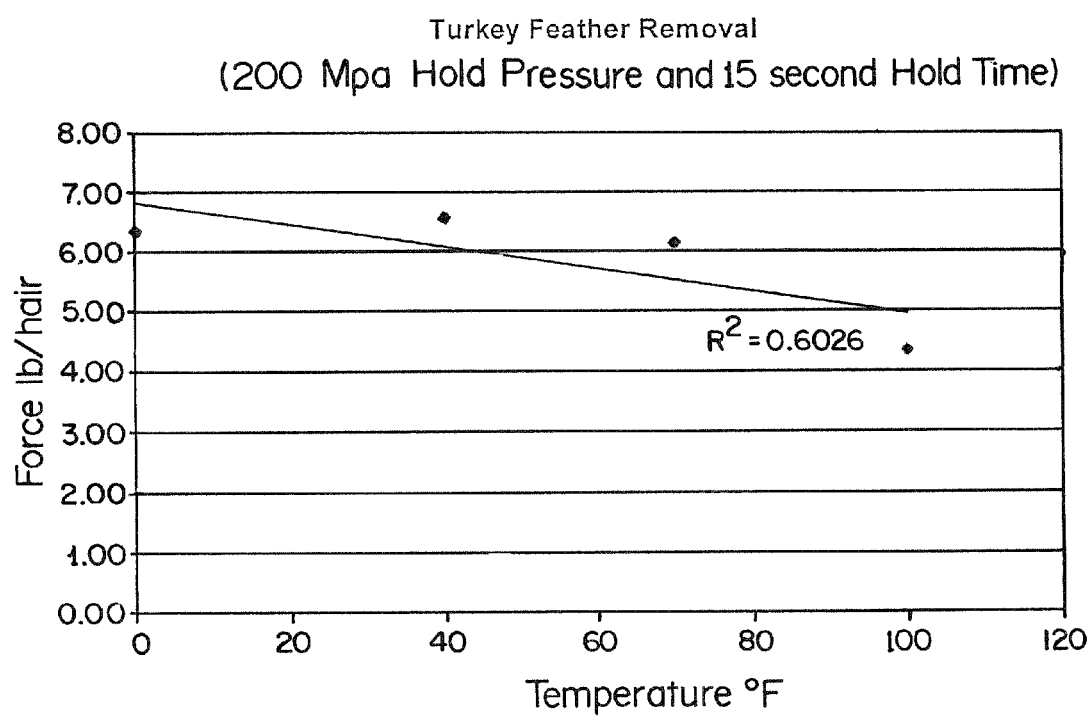
FIG. 11 is a graphical representation of the results of Example 11.

FIG. 11 shows the force for removal of turkey feathers when the pressure (200 MPa) hold time (15 seconds) were held constant and the temperature was varied (40°, 70° and 100° F.). The control required a force of 6.3 lbs. At a 40° F. water temperature in the vessel, the force required was 6.8 lbs; at 70° F., 6.1 lbs; and at 100° F., 4.3 lbs. It can be seen processing is preferred with a water temperature of at least 70° F. and preferably 100° F. or higher for better feather removal.

In other tests, it was found that the hold time did not significantly affect the removal of the turkey feathers.

EXAMPLE 12

For example 12, tests were conducted to determine the benefit of high pressure processing for the removal of toenails in pigs feet. For the first two samples (control), no treatment is done and the nails were not removed. For samples 3 through 10, the typical scald treatment was utilized in the prior art. Then, for samples 11 through 24, the pig feet were subjected to high pressure processing at 215 MPa for 15 seconds. For samples 11-16, the water temperature was 100.4° F. and the water temperature was 95° F. for samples 17-24. Samples 11 through 16 were high pressure processed in the processing facility whereas the samples 17 through 24 were high pressure processed in the research and development (R&D) facility. For the processing facility samples, it was necessary to bring the samples back to the R&D facility and therefore resulted in a delay and therefore the higher force needed. It is suspected that the differences in values between the processing that was done in the plant and the research and development (R&D) facility are due to the fact that there was 120 minutes between high pressure processing and analysis from the samples at the processing facility as compared to the samples at R&D were able to be analyzed in 10 minutes after high pressure processing.

Figure 12:
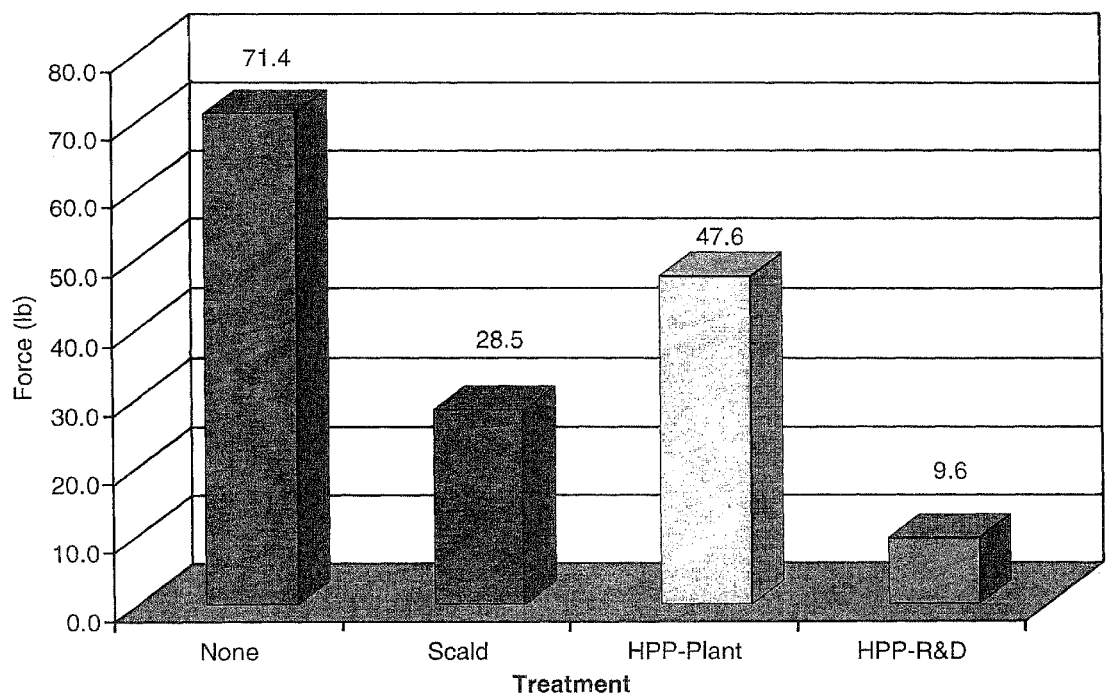
FIG. 12 is a graphical representation of the results of Example 12.

Graphically, these results are shown in FIG. 12. Control toenails required 71.4 lb. of force for removal of the toenail. For scalding, the force was reduced to 28.5 lb. At the processing facility, the force was reduced to 47.6 lb. Finally, only 9.6 lb. of force was needed to remove toenails from the samples high pressure processed at the R&D facility. It can be seen that the high pressure processing resulted in a significant improvement as compared to the scalding method.

| | | | | | Example 12 | | |
|---|---|---|---|---|---|---|---|
| Seq. # | Foot # | Treatment | Temperature (° F.) | Plant or R&D | ~Time between treatment and analysis (minutes) | Force to remove toenail (lb) |
| 1 | 1 | None | Room Temp | R&D | | 61.505 |
| 2 | 1 | None | Room Temp | R&D | | 81.328 |
| 3 | 2 | Scald | 138.2 | R&D | 5 | 4.897 |
| 4 | 2 | Scald | 138.2 | R&D | 5 | 13.164 |
| 5 | 3 | Scald | 138.2 | R&D | 5 | 44.585 |
| 6 | 3 | Scald | 138.2 | R&D | 5 | 43.750 |
| 7 | 4 | Scald | 138.2 | R&D | 5 | 20.811 |
| 8 | 4 | Scald | 138.2 | R&D | 5 | 27.621 |
| 9 | 5 | Scald | 138.2 | R&D | 5 | 32.023 |
| 10 | 5 | Scald | 138.2 | R&D | 5 | 41.272 |
| 11 | 1 | HPP-Plant | 100.4 | Plant | 120 | 49.484 |
| 12 | 1 | HPP-Plant | 100.4 | Plant | 120 | 39.977 |
| 13 | 2 | HPP-Plant | 100.4 | Plant | 120 | 64.047 |
| 14 | 2 | HPP-Plant | 100.4 | Plant | 120 | 46.991 |
| 15 | 3 | HPP-Plant | 100.4 | Plant | 120 | 58.627 |
| 16 | 3 | HPP-Plant | 100.4 | Plant | 120 | 26.751 |
| 17 | 1 | HPP-R&D | 95 | R&D | 10 | 6.990 |
| 18 | 1 | HPP-R&D | 95 | R&D | 10 | 9.605 |
| 19 | 2 | HPP-R&D | 95 | R&D | 10 | 8.242 |
| 20 | 2 | HPP-R&D | 95 | R&D | 10 | 10.063 |
| 21 | 3 | HPP-R&D | 95 | R&D | 10 | 6.352 |
| 22 | 3 | HPP-R&D | 95 | R&D | 10 | 16.705 |
| 23 | 4 | HPP-R&D | 95 | R&D | 10 | 9.802 |
| 24 | 4 | HPP-R&D | 95 | R&D | 10 | 8.734 |

As can be seen from the foregoing, the use of high pressure processing is beneficial for the treatment of animal carcasses/hides/skins for the removal of external carcass portions. It has been found that utilizing pressures from greater than 50 MPa to 500 MPa are beneficial.

Specifically, for the removal of feathers from poultry carcasses, including turkey carcasses, subjecting the carcass to a pressure of greater than 50 MPa results in the easier removal of the feathers. Preferably, the pressure is preferably 100 MPa or greater. Examples have been found of pressures of 200 MPa are also beneficial. Pressures above 200 MPa have not been tested specifically for feather removal, but it is anticipated that increased pressure would still be beneficial. Water temperatures that are used in the high pressure processing vessel of 60° F. or greater have been found to be useful as and more preferably 80° F. or greater.

For the removal of hair from beef carcasses, it has been found that pressures of greater than 50 MPa aid in the removal of hairs and further it is preferred that the pressures be 100 MPa or greater, with advantageous results being seen up to 250 MPa or greater. Also, in looking at the hold times for the time the carcass is in the high pressure processing vessel, it has been found that hold times of 30 seconds or greater are beneficial. Also, the temperature of the water in the high pressure processing vessel is also important. At 70° F. or higher improved results were found and at 100° F. or higher still better results were found.

In the removal of hairs from pig carcasses, it can be seen that pressures of greater than 50 MPa were beneficial in loosening the hairs from the pig carcass. Preferably, the pressure of 100 MPa or greater is more beneficial. Also it has been found that holding the pressure in the high pressure processing vessel for a time of 30 seconds or greater is preferred.

With respect to the removal of toenails and dewclaws from a pig carcass, subjecting the pig carcass to a pressure of greater than 150 MPa has been found beneficial in loosening the toenails or dewclaws. A pressure of 200 MPa or greater is preferred. Further, it is preferred that the temperature of the water utilized in the high pressure processing vessel is at least 60° F. or greater and the hold time is preferably 10 seconds or greater and more preferred 15 seconds or greater.

Finally, it is evident that subjecting the hide of an animal carcass to pressure in the range of from 10 to 50 MPa is beneficial in strengthening the hide of a pig's carcass. This can be seen in FIG. 3 wherein pressures of from 10 to 50 MPa actually resulted in more pressure being necessary to remove the hair from the pig's ear. This would show that the hide has been strengthened. Such strengthening would be beneficial for the hide of a pig, and more preferably for the hide of a beef carcass.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of removing external carcass portions from an animal carcass, the method comprising:
    (a) placing an animal carcass in a high pressure processing vessel;
    (b) subjecting the animal carcass to a pressure of greater than 50 MPa, wherein the external carcass portions are loosened from the carcass;
    (c) removing the animal carcass from the high pressure processing vessel; and
    (d) applying a force to the external carcass portions to remove the external carcass portions from the animal carcass.

2. The method of claim 1, wherein the animal carcass is subjected to pressure in the high pressure processing vessel for 20 minutes or less.

3. The method of claim 1, wherein the animal carcass is subjected to pressure in the high pressure processing vessel for 5 minutes or less.

4. The method of claim 1, wherein the pressure is from 50 MPa to 500 MPa.

5. The method of claim 1, the external carcass portions are from a pig carcass.

6. The method of claim 5, wherein the external carcass portions are hair from a pig carcass.

7. The method of claim 5, the external carcass portions are toenails from a pig carcass.

8. The method of claim 5, the external carcass portions are dewclaws from a pig carcass.

9. The method of claim 1, the external carcass portions are feathers from a poultry carcass.

10. The method of claim 1, the external carcass portions are feathers from a turkey carcass.

11. The method of claim 1, the external carcass portions are from a beef carcass.

12. The method of claim 1, further comprising water used to fill the high pressure processing vessel is at a temperature of at least 70° F.

13. A method of removing feathers from a poultry carcass, the method comprising:
    a) placing the poultry carcass in a high pressure processing vessel;
    b) subjecting the poultry carcass to a pressure of greater than 50 MPa, wherein feathers are loosened from the carcass;
    c) removing the poultry carcass from the high pressure processing vessel; and
    d) applying a force to the feathers to remove the feathers from the carcass.

14. The method of claim 13, wherein the pressure is 100 MPa or greater.

15. The method of claim 14, further comprising water that is used in the high pressure processing vessel is at a temperature of 60° F. or greater.

16. The method of claim 15 wherein the water temperature is 80° F. or greater.

17. A method of removing hairs from a beef carcass, the method comprising:
    a) placing the beef carcass in a high pressure processing vessel;
    b) subjecting the beef carcass to a pressure of greater than 50 MPa, wherein hairs are loosened from the carcass;
    c) removing the beef carcass from the high pressure processing vessel; and
    d) applying a force to the hairs to remove the hairs from the carcass.

18. The method of claim 17, wherein the pressure is 100 MPa or greater.

19. The method of claim 18, further comprising holding the pressure in the high pressure processing vessel for a time of 30 seconds or greater.

20. A method of removing hairs from a pig carcass, the method comprising:
    a) placing the pig carcass in a high pressure processing vessel;
    b) subjecting the pig carcass to a pressure of greater than 50 MPa, wherein hairs are loosened from the carcass;
    c) removing the pig carcass from the high pressure processing vessel; and
    d) applying a force to the hairs to remove the hairs from the carcass.

21. The method of claim 20, wherein the pressure is 100 MPa or greater.

22. The method of claim 21, further comprising holding the pressure in the high pressure processing vessel for a time of 15 seconds or greater.

23. A method of removing toenails from a pig carcass, the method comprising:
    a) placing the pig carcass in a high pressure processing vessel;
    b) subjecting the pig carcass to a pressure of greater than 150 MPa, wherein toenails are loosened from the carcass;
    c) removing the pig carcass from the high pressure processing vessel; and
    d) applying a force to the toenails to remove the toenails from the carcass.

24. The method of claim 23, wherein the pressure is 200 MPa or greater.

25. The method of claim 24, further comprising water that is used in the high pressure processing vessel is at a temperature of 60° F. or greater.

26. The method of claim 25 further comprising holding the pressure in the high pressure processing vessel for a time of 10 seconds or greater.

27. The method of claim 25 further comprising holding the pressure in the high pressure processing vessel for a time of 15 seconds or greater.

28. A method of strengthening a hide of an animal carcass, the method comprising:
   a) placing an animal carcass in a high pressure processing vessel;
   b) subjecting the animal carcass to a pressure of from 10 MPa to 50 MPa; and
   c) removing the animal carcass from the high pressure processing vessel, wherein the animal carcass's hide is strengthened.

29. The method of claim 28, further comprising holding the pressure in the high pressure processing vessel for a time of 15 seconds or less.

30. The method of claim 29, wherein the animal carcass is a beef carcass.

* * * * *